Jan. 17, 1933.    H. WEICHSEL    1,894,805
SINGLE PHASE MOTOR
Filed April 29, 1931

Inventor
H. WEICHSEL
By E.E. Huffman
Att'y.

Patented Jan. 17, 1933

1,894,805

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

SINGLE PHASE MOTOR

Application filed April 29, 1931. Serial No. 533,637.

My invention relates to single phase motors of the repulsion-induction type and its object is to provide means for improving the running performance of such machines as to power factor and output per unit of weight.

Figure 1:
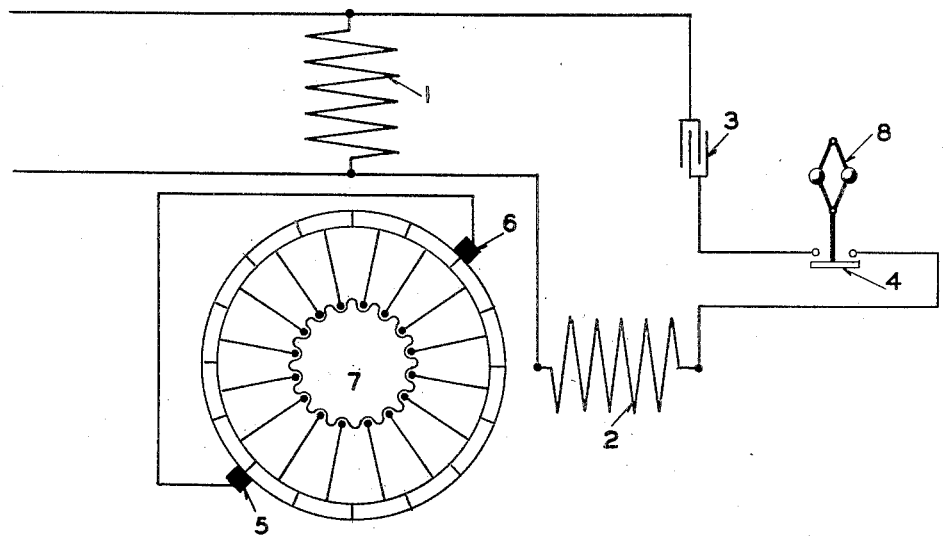
Figure 2:
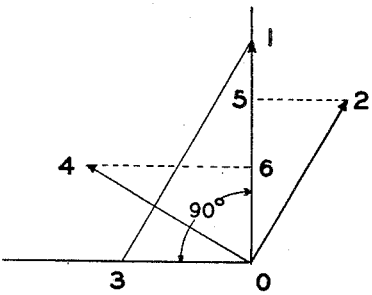
Figure 3:
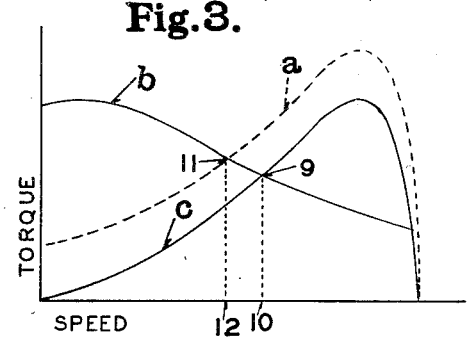

In the accompanying drawing Figure 1 diagrammatically illustrates a motor embodying my invention; and Figures 2 and 3 are vector and speed torque diagrams, respectively.

Referring to Figure 1, the motor is provided with a main inducing winding 1 and with an auxiliary inducing winding 2 displaced by 90 electrical degrees therefrom and connected to the line in parallel with said main inducing winding through condenser 3 and switch 4. The induced member is provided with a commuted winding which at starting is, by means of short-circuited brushes 5—6, closed along an axis displaced from the axis of the main inducing winding 1. The rotor is also provided with centrifugally operated short-circuiting mechanism diagrammatically indicated at 7 for short-circuiting the commuted winding along a plurality of axes when a predetermined speed has been attained.

During starting the switch 4 in the auxiliary winding circuit is preferably open and is closed by centrifugal means diagrammatically indicated at 8, said means being adjusted to operate at the same or approximately the same time as the rotor short-circuiting mechanism. During starting the motor operates as a repulsion motor, having good starting torque and drawing a relatively small starting current. The switch 4 in the auxiliary circuit can be left closed during the starting operation but the reactions produced by the auxiliary circuit materially decrease the starting torque and I, therefore, prefer to employ, as above indicated, a centrifugally actuated switch whereby the auxiliary circuit will be brought into operation only after a predetermined speed has been attained.

The effect of the auxiliary circuit is to improve the power factor of the machine and to increase its maximum power. The current and voltage relations effective in the stator circuits are indicated by the vector diagrams of Figure 2 wherein the vector 0—1 represents the line voltage which is impressed across the main winding of the machine; 0—2 represents current flowing in the main winding only; 0—3 the voltage induced in the auxiliary winding 2; 1—3 the voltage appearing across the terminals of the condenser; and 0—4 the current flowing through the condenser.

The input to the main inducing winding is proportional to the projection 0—5 of the vector 0—2 on the vector 0—1. The energy input to the auxiliary winding is represented by the projection 0—6 of vector 0—4 on vector 0—1. The total input of the machine is consequently proportional to the sum of the vectors 0—5 and 0—6.

My machine has a further advantage in that torque effective when the short-circuiting mechanism operates is higher than in a straight repulsion-induction motor. This is illustrated by means of the diagram of Figure 3 wherein the curve "$a$" represents the speed torque characteristic of an induction motor having a condenser in the auxiliary circuit; curve "$b$" the speed torque curve of a straight repulsion motor; curve "$c$" the speed torque curve of a straight induction motor. In a standard repulsion-induction motor the short-circuiting mechanism should be set to operate at the speed corresponding to the point of intersection of curves "$b$" and "$c$", the torque at the change-over being represented by the line 9—10. In a motor constructed in accordance with my invention the short-circuiting mechanism and the centrifugal switch operating means 8 should be set to operate at a speed corresponding to the intersection of curves "$a$" and "$b$", at which time the torque in effect is represented by the line 11—12.

Having fully described my invention, what I claim as new and desire to secure by Letters Patent of the United States is:

1. In a single phase motor, an induced member provided with a commuted winding, an inducing member provided with a main inducing winding and with an auxiliary inducing winding displaced therefrom, a phase displacing circuit comprising said auxiliary winding and a condenser, said phase displacing circuit being inoperative at starting, means for connecting said phase displacing circuit to the line in parallel with the main inducing winding, means for closing the commuted winding along an axis displaced from the axis of the main inducing winding, and means for short-circuiting the induced member along a plurality of axes.

2. In a single phase motor, an induced member provided with a commuted winding, an inducing member provided with a main inducing winding and with an auxiliary inducing winding displaced therefrom, a phase displacing circuit comprising said auxiliary winding and a condenser, means including a speed controlled switch for connecting said phase displacing circuit to the line in parallel with the main inducing winding, means for closing the commuted winding along an axis displaced from the axis of the main inducing winding, and means for short-circuiting the induced member along a plurality of axes, said last named means and the means for closing the switch in the phase displacing circuit being adjusted to operate approximately simultaneously.

In testimony whereof, I hereunto affix my signature, this 23d day of April, 1931.

HANS WEICHSEL.